Figure 1:
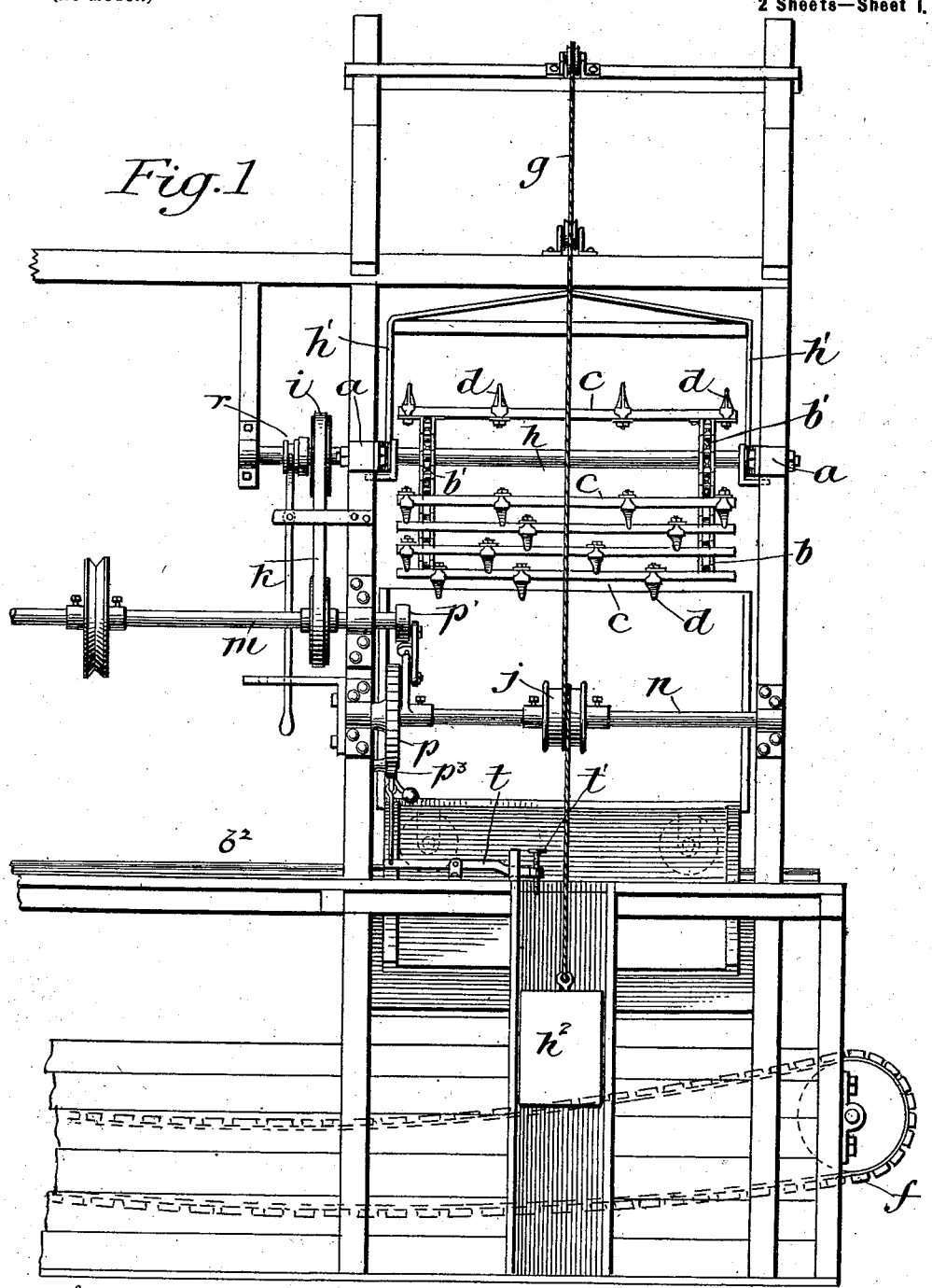

No. 702,096. Patented June 10, 1902.
H. FROEHLICH.
MACHINE FOR UNLOADING CANE CARS.
(Application filed Oct. 22, 1901.)
(No Model.) 2 Sheets—Sheet 1.

Witnesses:
D. W. Edelin.
M. L. Adams.

Inventor
Henry Froehlich,
By his attys,
Pennie & Goldsborough

THE NORRIS PETERS CO., PHOTO-LITHO., WASHINGTON, D. C.

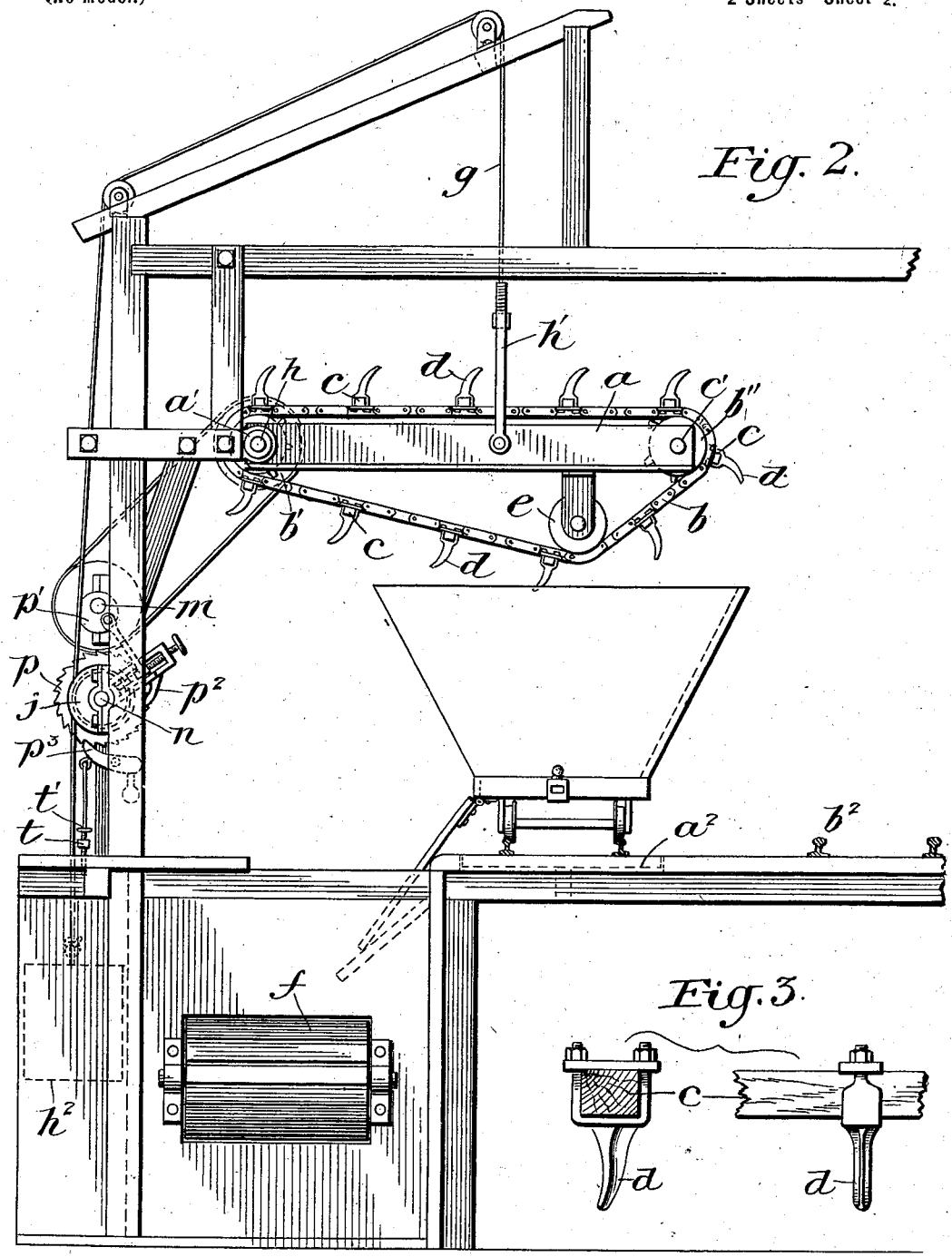

UNITED STATES PATENT OFFICE.

HENRY FROEHLICH, OF LIHUE, TERRITORY OF HAWAII.

MACHINE FOR UNLOADING CANE-CARS.

SPECIFICATION forming part of Letters Patent No. 702,096, dated June 10, 1902.

Application filed October 22, 1901. Serial No. 79,589. (No model.)

*To all whom it may concern:*

Be it known that I, HENRY FROEHLICH, a citizen of the United States, residing at Lihue, Island of Kauai, Territory of Hawaii, have invented a new and useful Machine for Unloading Cane-Cars, of which the following is a specification.

My invention relates to improvements in machines for unloading sugar-cane cars.

By my improvements one machine automatically with one man does the work heretofore done by two or more machines operated by from six to ten men.

The object to be accomplished is the unloading of the cane brought in from the canefield on cars onto the cane-carrier leading to the mill, depositing same as evenly as possible thereon. This was originally done by hand and with the use of rakes and hooks, requiring from six to eight men to each car. Machines have since been introduced which pull the cane from the car; but they all require several men to operate them and are not automatic in action and are slow and only partially effective.

My invention is a machine which is automatic in action, efficient, and a labor-saver, as is hereinafter fully described.

Referring to the drawings herewith, Figure 1 is a side elevation showing a car nearly unloaded by my machine. Fig. 2 is an end elevation showing the machine starting to unload a full car. Fig. 3 is a detail of the manner of securing the fingers to the slats.

I employ a pivoted movable frame $a$, carrying endless revolving belts $b$, which are connected at intervals by slats $c$, to which fingers $d$ are attached. This frame $a$ being lowered automatically on its pivot $a'$, which is coincident with the shaft $h$, the fingers $d$ engage with the cane on the car to be unloaded. These fingers pull the cane toward and cause it to drop upon the cane-carrier $f$, leading to the mill. I am aware that a swinging hinged frame with endless belts and fingers attached to or a part of the chain-links has been used; but I employ two endless chains carrying slats, upon which slats the fingers are attached. I am aware that a hinged frame has been used operated by hand; but I operate the hinged frame automatically, as hereinafter described. The hinged ends of the frame are so made as to allow a shaft $h$ to revolve freely with its axis concentric with that of the hinges, but without touching the shaft. This is the driving-shaft of the swinging frame, and it extends out on one side to carry a sprocket $i$, driven by a chain belt $k$ from a pulley or sprocket $m'$ on the main line pulley or shaft $m$. A clutch $r$ is shown in Fig. 1 for stopping this shaft when necessary.

It will be seen from the drawings that the two chain belts which carry the slats to which the fingers are secured pass over sprockets $b'$ on this driving-shaft at the hinged end of the frame, and then out over sprockets $b''$ on an idler-shaft at the outer end of the frame, and then run on idler-sprockets $e$, placed under the swinging frame, thence back to the driving-sprockets forming the endless chains. The object of this construction is to cause the fingers to travel in such a way as to clean the bottom of the car when the frame is at its lowest position, the location of the center on which the frame $a$ swings and the idlers $e$ being such as to accomplish this result. The fingers are about six inches long and are made to grip the slats instead of being bolted through same, which would weaken the slats. By this construction these fingers may be clamped anywhere on the slats, as shown in Fig. 1, and not in regular lines, as when attached to chains, as in other machines.

In Fig. 2 the car is shown resting on a turntable $a^2$, and when the car is empty it is transferred to the outgoing track $b^2$, which is a customary arrangement; but the machine may be located in any suitable position along the cane-carrier to mill. This cane-carrier is shown at $f$ in Fig. 1. The swinging frame $a$ is gradually lowered until the car is empty and is then swung up to be ready to begin on the next car. This lowering I term a "feed," and I produce this feed automatically, the speed of which can be regulated to suit the conditions. One therefor accomplishing this is shown in the drawings and is described hereinafter; but I do not wish to limit myself to this construction. The swinging frame is shown supported by a flexible wire rope $g$, attached to a yoke $h'$, hinged to the sides of the frame $a$ in such a way as to clear the fingers in every position. This rope then passes over sheaves to change its direction and has a counterweight $h^2$ at its outer end, which weight is slightly heavier than that of the suspended frame. Between the weight $h^2$ and the sheave above it the rope $g$ passes around a drum $j$ a few turns for a friction grip on same. This drum is fastened on a shaft $n$ in suitable journals, and by rotating this drum-shaft $n$, so as to lift the weight $h^2$, the swinging frame is thereby lowered, so as to produce the feed. I operate this drum-shaft by a ratchet-wheel $p$, secured to same, and a pawl $p^2$, operated by an eccentric, crank, or similar arrangement $p'$ from the main line-shaft $m$, the pawl being connected to the eccentric by the link $p^4$. The excess or difference in weight between the weight $h^2$ and the suspended frame has a tendency to turn the drum $j$ and its shaft $n$. The pawl operated from the shaft $m$ has to overcome this in order to rotate the shaft $n$. A second pawl $p^3$, (shown under the ratchet-wheel in Fig. 2,) operated by gravity, prevents the ratchet-wheel $p$ on the shaft $n$ from receding when advanced by the first pawl. In operation this automatic feed continues until the frame $a$ is lowered so that the fingers $d$ just clear the bottom of the car, at which point the weight $h^2$ is at its highest position and has raised a lever $t$, which releases the second pawl above mentioned from the ratchet-wheel $p$, thereby stopping the feed or lowering of the swinging frame. This is a safety device operated automatically and prevents damage either to the car or to the machine itself through the carelessness of the operator if it were left for him to stop the feed at the proper time. I have shown a screw $t'$ through the end of this lever $t$, against which the weight $h^2$ pushes, so that the time when the weight $h^2$ operates the lever $t$ with respect to the position of the swinging frame can be easily adjusted. The pawl operated by the shaft $m$ is arranged so that its throw may be altered by changing the point of connection of the link $p^4$ with the pawl by means of the screw $p^5$, thereby regulating the speed of the feed. The arrangement shown in Fig. 1 for accomplishing this is like that used on a shaper or planer; but any similar device may be employed. In case the cane-carrier is temporarily stopped the feed of the unloader is easily stopped by releasing the second pawl above mentioned. This construction requires but one operator and produces an adjustable, automatic, even feed. By releasing both pawls the frame swings up into position ready to begin on the next loaded car.

Having described my invention, what I claim, and desire to secure by Letters Patent, is—

1. In a cane-unloader, the combination of a pivoted frame, an endless toothed carrier traveling on said frame, means permitting the frame and carrier to descend as the unloading proceeds, and means for automatically discontinuing the descent at a predetermined point.

2. In a cane-unloader, the combination of a pivoted frame, an endless toothed carrier traveling on said frame, an operating-shaft for the carrier, a winding-drum having a flexible connection with the frame, means operated by the carrier-shaft for turning the drum to lower the frame, and an automatic device to discontinue the rotation of the drum at a predetermined point.

3. In a cane-unloader, the combination of a pivoted frame carrying an endless toothed carrier, a shaft $h$ for operating the carrier, a shaft $n$ having a winding-drum, a flexible connection $g$ from the drum to the frame, a shaft $m$, a pawl-and-ratchet mechanism operated thereby to unwind the drum and allow the carrier-frame to descend, a weight $h^2$ carried by the connection $g$, and a trip $f$ adapted to be struck by the weight and discontinue the unwinding of the drum at a predetermined time.

In testimony whereof I have signed my name to this specification in the presence of two subscribing witnesses.

HENRY FROEHLICH.

Witnesses:
 ROBT. J. PRATT,
 ALBERT F. JUDD.